United States Patent
Choi

(10) Patent No.: US 6,571,659 B2
(45) Date of Patent: Jun. 3, 2003

(54) DRIVER LEG SAFEGUARD STRUCTURE IN AUTOMOBILE

(75) Inventor: Jae-Il Choi, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/753,253

(22) Filed: Dec. 27, 2000

(65) Prior Publication Data

US 2001/0006010 A1 Jul. 5, 2001

(30) Foreign Application Priority Data

Dec. 29, 1999 (KR) .......................................... 99-64834

(51) Int. Cl.⁷ ................................................. G05G 1/14
(52) U.S. Cl. ...................................................... 74/512
(58) Field of Search ........................... 74/512, 513, 560

(56) References Cited

U.S. PATENT DOCUMENTS

| | | | | |
|---|---|---|---|---|
| 3,807,253 A | * | 4/1974 | Belzile et al. ................. 74/512 |
| 5,842,364 A | * | 12/1998 | Oliver ......................... 188/265 |
| 5,916,330 A | * | 6/1999 | Jacobson ...................... 74/512 |
| 6,089,119 A | * | 7/2000 | Leboisne et al. ............ 180/274 |
| 6,179,081 B1 | * | 1/2001 | Engelgau ..................... 180/170 |
| 6,182,525 B1 | * | 2/2001 | Bowers et al. .............. 180/274 |
| 6,279,417 B1 | * | 8/2001 | Mizuma et al. ............. 180/274 |
| 6,286,388 B1 | * | 9/2001 | Brewer ........................ 74/512 |
| 6,364,046 B1 | * | 4/2002 | Forssell et al. ............. 180/275 |

* cited by examiner

Primary Examiner—David A. Bucci
Assistant Examiner—Vicky A. Johnson
(74) Attorney, Agent, or Firm—Christie Parker & Hale, LLP

(57) ABSTRACT

A driver leg safeguard structure in automobile constructed and arranged to prevent a shin injury of a driver by distancing a pedal from the driver when the pedal is pushed to the driver in the event of a head-on collision or when the driver is pushed to the pedal in the event of sudden stop or collision of automobile, the structure comprising: an upper pedal fixed to an interior at a driver's eat via a rotary axle; a lower pedal rotatably connected to a master cylinder rod via a hinge pin and formed with a pedal part on which the driver steps; and a connecting unit mounted between the upper pedal and the lower pedal for simultaneous rotation of the upper and lower pedals or for rotation of only the lower pedal when the lower pedal is trod.

2 Claims, 6 Drawing Sheets

DRIVER LEG SAFEGUARD STRUCTURE IN AUTOMOBILE

CROSS-REFERENCE TO RELATED APPLICATION

This application claims priority of Korea patent Application No. 99-64834, filed on Dec. 29, 1999.

BACKGROUND OF THE INVENTION

1. Field of the Invention

The present invention relates to a knee protection structure in an automobile for protection of leg injury of a driver, and more particularly to a driver leg safeguard structure in automobile adapted to prevent injury to shin of a driver when a collision occurs.

2. Description of the Prior Art

Generally, when a driver sits on a driver seat, steering wheel, accelerator, brake pedal, clutch pedal and the like come positioned near the driver In other words, the steering wheel, pedals and the like are frequently manipulated by the driver such that they should be situated close to the driver. Particularly, pedals should have to be continuously stepped to be positioned near driver's feet.

As illustrated in FIG. 6, a brake pedal mechanism consists of a booster 50 fixed to a dash panel (D) and a master cylinder 51, and a brake pedal 54 connected to the booster 50 and the master cylinder 51 via a rod 52 and a rotary axle 53.

When the brake pedal 54 (other pedals are also installed nearby) is mounted to the dash panel (D), driver's foot (L) is positioned close to the pedal 54 as illustrated in FIG. 4 where a tip of the brake pedal 54 comes to a shin part of the driver's leg.

There is a problem in the brake pedal 54 positioned near the shin of the driver's leg in that the pedal hits the shin causing injury when the driver is pushed forward to the pedal direction by kinetic inertia and shock thereof in the event of a collision. In other words, the brake pedal maintains a predetermined angle to provide a convenience to the driver's easy manipulation, where a slight push of the driver to the pedal results in enables a contact with the shin to the pedal causing an injury thereto due to close approximation between the shin and the pedal.

SUMMARY OF THE INVENTION

The present invention is provided to solve the aforementioned problem and it is an object of the present invention to provide a driver leg safeguard structure in automobile constructed and arranged to prevent a shin injury of a driver by distancing a pedal from the driver when the pedal is pushed to the driver in the event of a head-on collision or when the driver is pushed to the pedal in the event of a sudden stop or a collision of automobile.

In accordance with the object of the present invention, there is provided a driver leg safeguard structure in automobile, the structure comprising:

an upper pedal fixed to an interior at a driver's seat via a rotary axle;

a lower pedal rotatably connected to a master cylinder rod via a hinge pin and formed with a pedal part on which the driver steps; and connecting means mounted between the upper pedal and the lower pedal for simultaneous rotation of the upper and lower pedals or for rotation of only the lower pedal when the lower pedal is trod.

BRIEF DESCRIPTION OF THE DRAWINGS

For fuller understanding of the nature and objects of the invention, reference should be made to the following detailed description taken in conjunction with the accompanying drawings in which:

FIG. 1b is a lateral view for illustrating a folded pedal state according to FIG. 1a;

FIG. 2 is a left lateral view of FIG. 1a;

FIG. 3 is an exploded perspective view of FIG. 1a;

DETAILED DESCRIPTION OF THE INVENTION

Figure 1A:
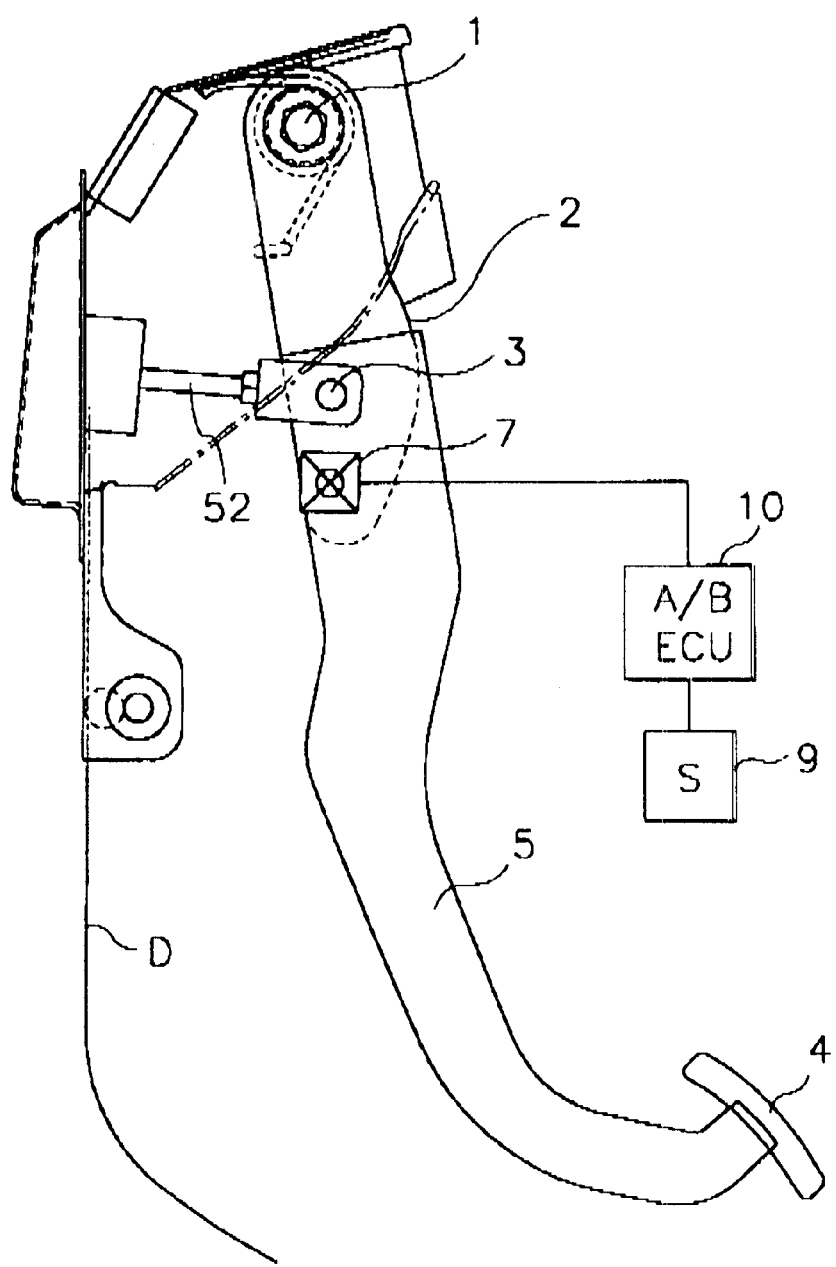
FIG. 1a is a schematic lateral view for illustrating a driver's leg protection structure of an automobile according to a first embodiment of the present invention.
Figure 1B:
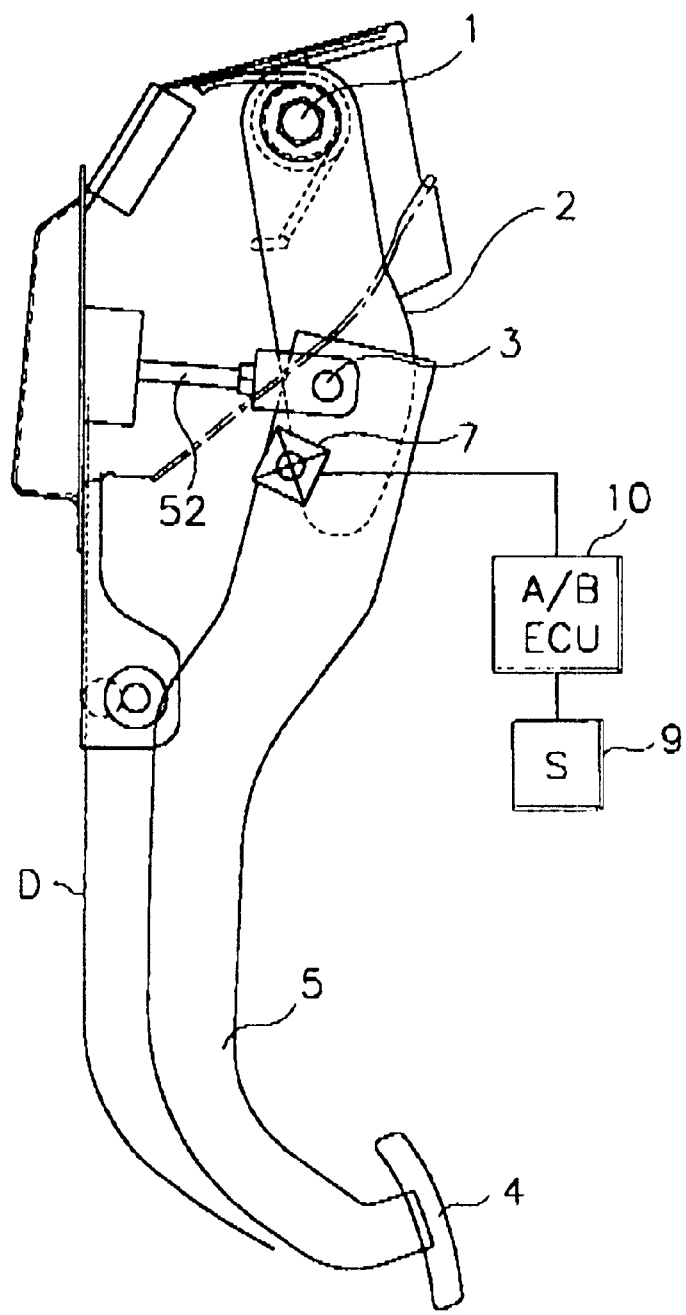
Figure 2:
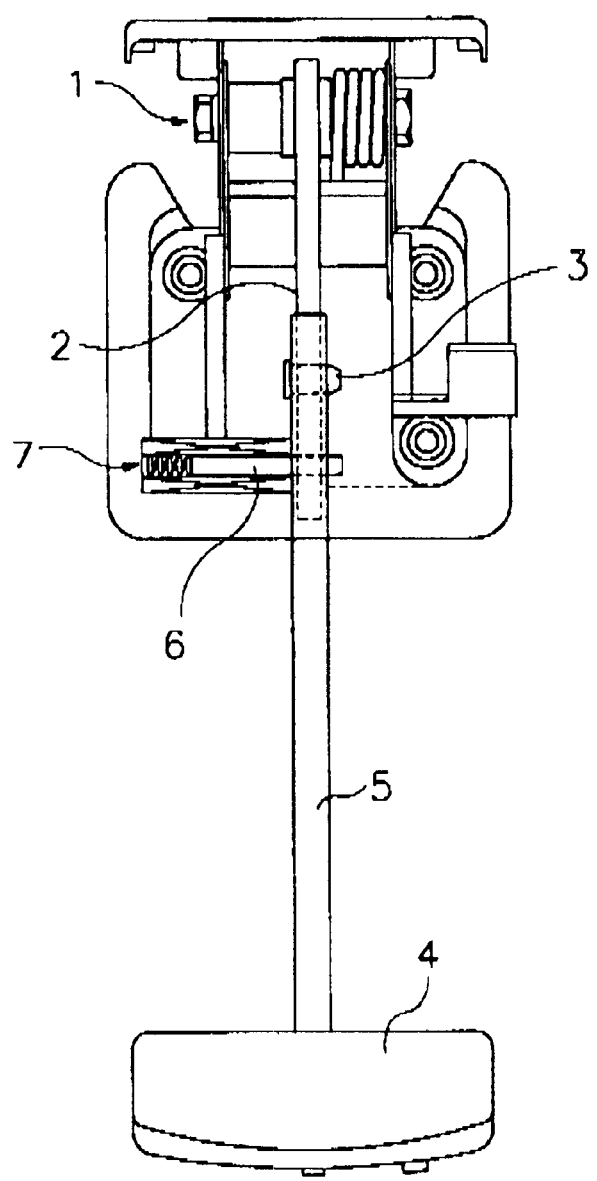
Figure 3:
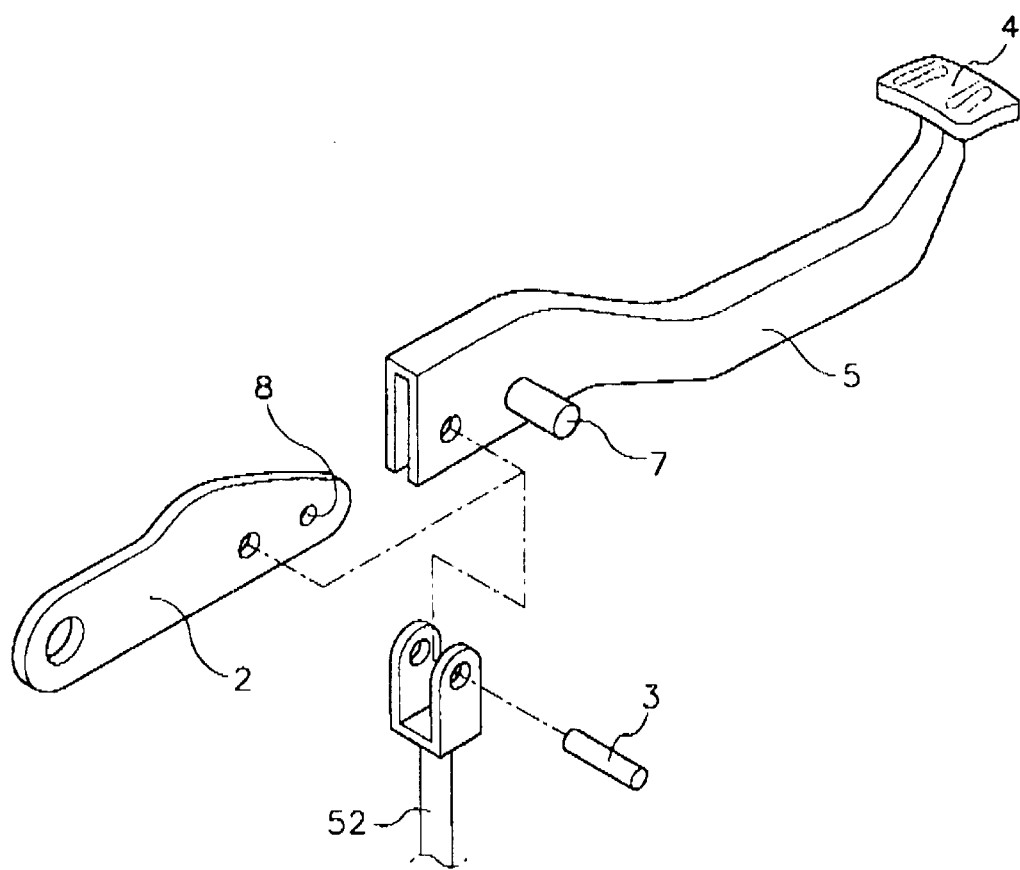

FIGS. 1a, 1b, 2 and 3 are respectively schematic lateral views, left lateral view and exploded perspective views for illustrating a driver's leg safeguard structure of an automobile according to a first embodiment of the present invention, where the structure includes an upper pedal 2 fixed to an interior of an automobile proximate a driver's seat via a rotary axle 1, a lower pedal 5 rotatably connected to a master cylinder rod 52 via a hinge pin 3 and formed with a pedal part 4 on which the driver steps, and connecting means mounted between the upper pedal 2 and the lower pedal 5 for simultaneous rotation of the upper and lower pedals 2 and 5 or for rotation of only the lower pedal 5 when the lower pedal 5 is trod.

In other words, when the connecting means finishes connecting the upper and the lower pedals 2 and 5, the upper and lower pedals 2 and 5 are concurrently rotated when the pedal part 4 at the lower pedal 5 is pressed to perform the braking operation. When the connecting means separates the upper and the lower pedals 2 and 5, only the lower pedal 5 is rotated about the hinge pin 3 and folded to be distanced from a driver's leg.

The connecting means includes a solenoid 7 fixed to the lower pedal 5 and formed with a plunger 6 protruding into an inner side of the lower pedal 5, a coupling slot 8 formed at the upper pedal 2 for the plunger 6 to go therethrough, and an airbag electronic control unit (ECU) 10 for receiving information from a collision sensor 9 by actuating the solenoid 7 to separate the upper and the lower pedal 2 and 5 when an automobile collides.

In the present invention, the airbag ECU 10 is used to control the solenoid 7 with no further devices added due to a signal supplied from a shock sensor.

Now, operational effect of the first embodiment according to the present invention thus constructed will be described.

In the event of a head-on collision or a side collision, a crash pad is rushed toward the driver being deformed, or an automobile is abruptly stopped in running, causing the shock sensor 9 to transmit a shock signal to the airbag ECU 10.

When the shock signal is applied to the airbag ECU 10, a current is applied in turn to the solenoid 7. When the solenoid 7 is applied with the current, the plunger 6 at the solenoid 7 is pulled to the left (in FIG. 2), where the plunger 6 is detached from the coupling slot 8 of the upper pedal 2.

When the plunger 6 is removed from the coupling slot 8 of the upper pedal 2, which means that a part connecting the upper and lower pedals 2 and 5 is eliminated, the upper and lower pedals 2 and 5 are separated to perform independent operation. When the upper and lower pedals 2 and 5 are separated, only the lower pedal 5 is folded as in FIG. 1b, where the lower pedal 5 is prevented from contacting shin of a driver or strength on contact is weakened. In other words, the crash pad is rushed toward the driver being deformed, or the driver is pushed forward by inertia and the like when the automobile stops running to allow the pedal to touch the shin part of the driver, where the shock strength is decreased as much as the folded portion of the lower pedal 5. When the shock strength to the shin of the driver is reduced as much as the folded portion of the lower pedal 5, injury to the shin therefore is weakened or the injury can be prevented.

Figure 4:
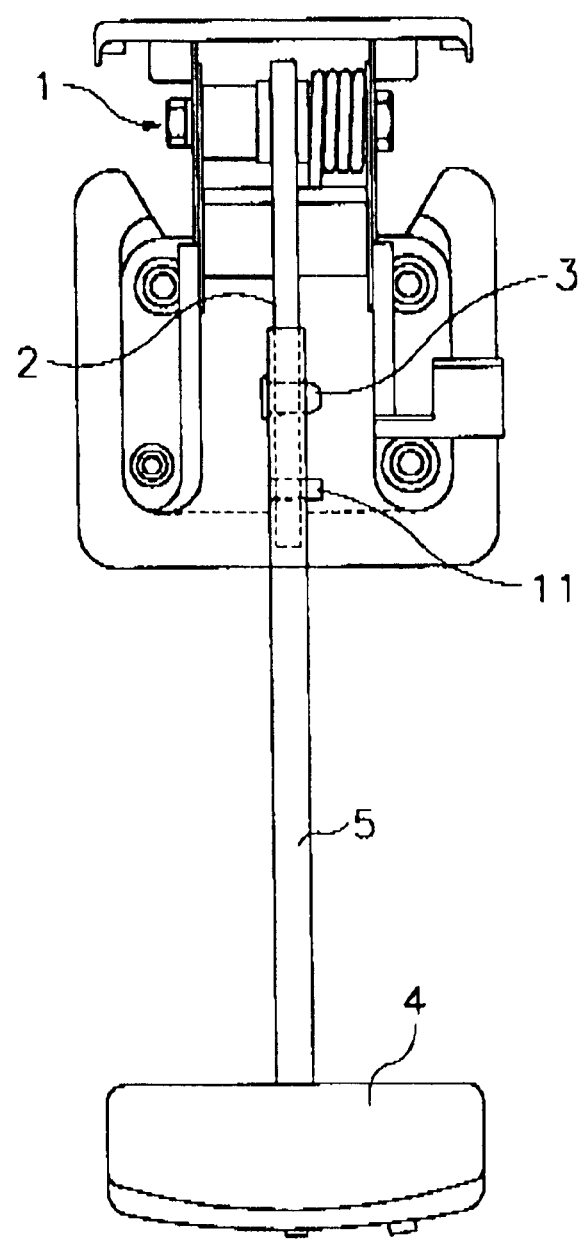
FIG. 4 is a left lateral view for illustrating a driver's leg protection structure of an automobile according to a second embodiment of the present invention.
Figure 5:
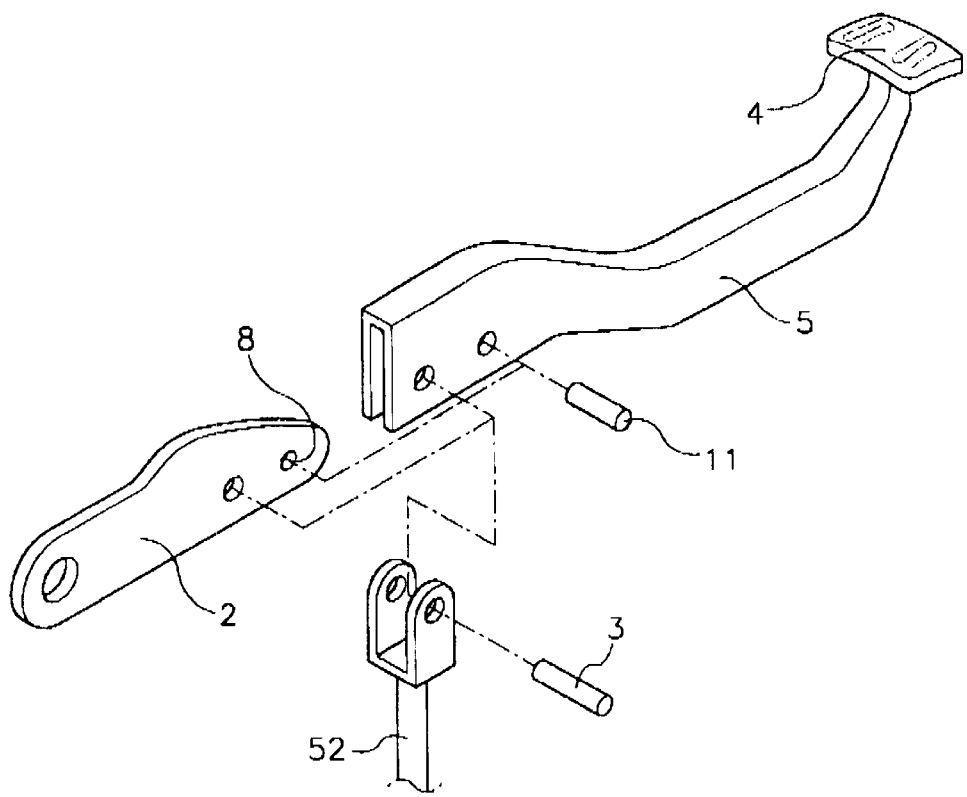
FIG. 5 is an exploded perspective view for illustrating a driver's leg protection structure of an automobile according to a second embodiment of the present invention.
Figure 6:
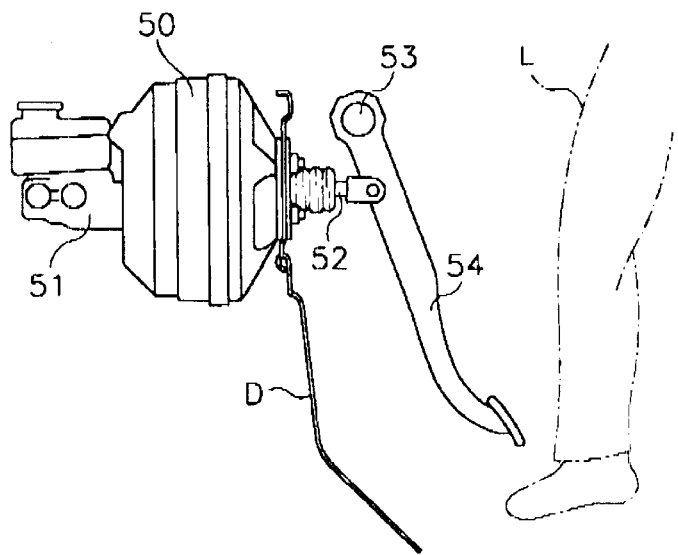
FIG. 6 is a lateral view for illustrating an installed state of brake pedal according to the prior art.

Further, FIGS. 4 and 5 are respectively a left lateral view and an exploded perspective view for illustrating a driver's leg protection structure of an automobile according to a second embodiment of the present invention, where the structure the upper pedal 2 fixed to an interior at a driver's seat via the rotary axle 1, a lower pedal 5 rotatably connected to a master cylinder rod 52 via a hinge pin 3 and formed with a pedal part 4 on which is driver steps, and a shearing pin 11 being disposed underneath a hinge pin 3 connecting an upper pedal 2 and a lower pedal 5 for shearing when the upper pedal 2 and lower pedal 5 is concurrently rotated during the lower pedal 5 is stepped on, or when more than a predetermined amount of load is applied to the lower pedal 5.

Now, operational effect of the second embodiment according to the present invention thus described will be described.

When a crash pad is pushed in deformed toward the driver or pushed forward by inertia or the like when there occurs a head-on collision or a side collision, a shearing pin 11 connected underneath the hinge pin 3 connecting the upper pedal 2 and the lower pedal 5 is rendered broken by the shock therefrom separating the upper and lower pedals 2 and 5, such that the pedals 2 and 5 perform separate operations about respective hinge pins.

As apparent from the foregoing, there is an advantage in the driver leg safeguard structure in automobile thus described according to the present invention in that a lower pedal is folded in a pedal assembly formed with an upper pedal and the lower pedal to prevent shin from crashing the pedal or to markedly reduce the crashing strength in the event of a collision, thereby protecting the driver from serious injury.

What claimed is:

1. A driver leg safeguard structure in an automobile, the structure comprising:

an upper pedal coupled to an automobile interior proximate a driver's seat via a rotary axle;

a lower pedal rotatably connected to a master cylinder rod via a hinge pin and formed with a pedal part on which a driver steps; and connecting means offset from the hinge pin and mounted between the upper pedal and the lower pedal for simultaneous rotation of the upper and lower pedals or for rotation of only the lower pedal when the lower pedal is trod, wherein the connecting means comprises, a solenoid fixed to the lower pedal and formed with a plunger protruding into an inner side of the lower pedal, a coupling slot formed at the upper pedal for the plunger to go therethrough, and an airbag electronic control unit for receiving information from a collision sensor by actuating the solenoid to separate the upper and the lower pedal when an automobile collides.

2. A driver leg safeguard structure in an automobile, the structure comprising:

an upper pedal coupled to an automobile interior proximate a driver's seat via a rotary axle;

a lower pedal rotatably connected to a master cylinder rod via a hinge pin and formed with a pedal part on which a driver steps; and connecting means mounted between the upper pedal and the lower pedal for simultaneous rotation of the upper and lower pedals or for rotation of only the lower pedal when the lower pedal is trod, wherein the connecting means comprises, a solenoid fixed to the lower pedal and formed with a plunger protruding into an inner side of the lower pedal, a coupling slot formed at the upper pedal for the plunger to go therethrough, and an airbag electronic control unit for receiving information from a collision sensor by actuating the solenoid to separate the upper and the lower pedal when an automobile collides.

\* \* \* \* \*